United States Patent
Kim

(10) Patent No.: US 9,268,816 B2
(45) Date of Patent: Feb. 23, 2016

(54) APPARATUS AND METHOD FOR SEARCHING FOR PLC DATA LOG

(71) Applicant: LSIS CO., LTD., Anyang-si, Gyeonggi-do (KR)

(72) Inventor: Seung Jong Kim, Chungcheongbuk-do (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 227 days.

(21) Appl. No.: 13/937,047

(22) Filed: Jul. 8, 2013

(65) Prior Publication Data
US 2014/0012872 A1   Jan. 9, 2014

(30) Foreign Application Priority Data
Jul. 9, 2012   (KR) .................. 10-2012-0074702

(51) Int. Cl.
*G06F 7/00*   (2006.01)
*G06F 17/30*  (2006.01)
*G05B 19/05*  (2006.01)

(52) U.S. Cl.
CPC .......... *G06F 17/30477* (2013.01); *G05B 19/05* (2013.01)

(58) Field of Classification Search
CPC .............................................. G06F 17/30424
USPC ................................................. 707/711, 741
See application file for complete search history.

(56) References Cited

U.S. PATENT DOCUMENTS

| | | | | |
|---|---|---|---|---|
| 2004/0210629 | A1* | 10/2004 | Klindt | G05B 19/056 709/202 |
| 2009/0292511 | A1* | 11/2009 | Vrancic | G06F 17/12 703/2 |
| 2012/0331352 | A1* | 12/2012 | Guenther | G05B 19/0426 714/38.1 |

FOREIGN PATENT DOCUMENTS

| | | |
|---|---|---|
| JP | 02-155072 | 6/1990 |
| JP | 08-221241 | 8/1996 |
| JP | 09-306146 | 11/1997 |
| JP | 2007-213451 | 8/2007 |
| JP | 2013-143572 | 7/2013 |

OTHER PUBLICATIONS

Japan Patent Office Application Serial No. 2013-143572, Notice of Allowance dated Oct. 20, 2015, 3 pages.

* cited by examiner

*Primary Examiner* — Jacob F Bétit
*Assistant Examiner* — Van Oberly
(74) *Attorney, Agent, or Firm* — Lee, Hong, Degerman, Kang & Waimey

(57) ABSTRACT

Disclosed are an apparatus and a method for searching a PLC data log. The apparatus for searching for a PLC data log, includes: a data log module operating a linear characteristic for data search based on at least one data search parameter, calculating an index value or a time data value using the operated linear characteristic, and searching for data using at least one of the calculated index value or the calculated time data value; an interface unit receiving a search request signal and at least one parameter for data search and outputting the data searched from the data log module; and a memory unit storing the data and the parameter input or output through the interface unit.

13 Claims, 4 Drawing Sheets

APPARATUS AND METHOD FOR SEARCHING FOR PLC DATA LOG

CROSS-REFERENCE TO RELATED APPLICATIONS

Pursuant to 35 U.S.C. §119(a), this application claims the benefit of earlier filing date and right of priority to Korean Patent Application No. 10-2012-0074702, filed on Jul. 9, 2012, the contents of which is incorporated by reference herein in its entirety.

BACKGROUND

The embodiment relates to an apparatus and a method for searching for a programmable logic controller (PLC) data log.

A data log may be collected according to the input condition of device values of a PLC CPU and may be stored in a storage device such as a memory card as data. The stored data may be searched in match with the requirements of a user.

A data log module must store values processed by the PLC CPU at a high rate without loss. In this manner, when searching for the stored data while storing data at the high rate, many times are required and wrong values may be searched.

FIG. 1 is a flowchart illustrating a method of searching for PLC log data according to the related art.

Referring to FIG. 1, an apparatus for searching for a PLC data log receives a parameter for a search target from a user (S102) and receives a search request signal for the received parameter (S104).

Based on the data stored in a memory area, the apparatus for searching for a PLC data log determines whether the input parameter is in a parameter range of the data stored in the memory area (S108).

When the search target data are not included in the parameter range of the stored data (S110), the apparatus for searching for a PLC data log may continuously perform the search operation or arbitrarily terminate the search operation (S112).

In contrast, when the data parameter for the search target is within the parameter range of the stored data, the search target data are searched within the parameter range (S114). When the search data exist, the search data are output (S116).

In contrast, when there are no search data, the existence of the search data is searched again by reducing the parameter range to a half (S118).

As described above, according to the related art, when a time required to perform a search function becomes longer, the whole performance of the apparatus for searching for a data log may be degraded. That is, the method for searching for data according to the related art must search for data several times by applying a character string scheme when large amounts of data are stored in a memory. When searching for data using a character string comparison scheme, a search completion time is not clear and the search operation must be repeated to precisely search for the desired data. Accordingly, a search time may be delayed and a function of the apparatus may be degraded.

SUMMARY

The embodiment provides an apparatus and a method for searching for a PLC data log, capable of rapidly and exactly searching and outputting data required by a user when searching for a large amount of PLC data logs.

In addition, the embodiment provides an apparatus and a method for searching for a PLC data log, capable of minimizing a load to a data search device by allowing a user to rapidly search for data required by the user using a linear characteristic when searching for the PLC data log.

According to the embodiment, there is provided an apparatus for searching for a PLC data log, the apparatus including: a data log module operating a linear characteristic for data search based on at least one data search parameter, calculating an index value or a time data value using the operated linear characteristic, and searching for data using at least one of the calculated index value or the calculated time data value; an interface unit receiving a search request signal and at least one parameter for data search and outputting the data searched from the data log module; and a memory unit storing the data and the parameter input or output through the interface unit.

According to the embodiment, there is provided a method for searching for a PLC data log, including receiving a search parameter; calculating a linear coefficient for search target data; calculating a time data value or an index value from the linear coefficient; and searching for data corresponding to the calculated time data value or the calculated index value.

DETAILED DESCRIPTION OF THE EMBODIMENTS

Figure 1:
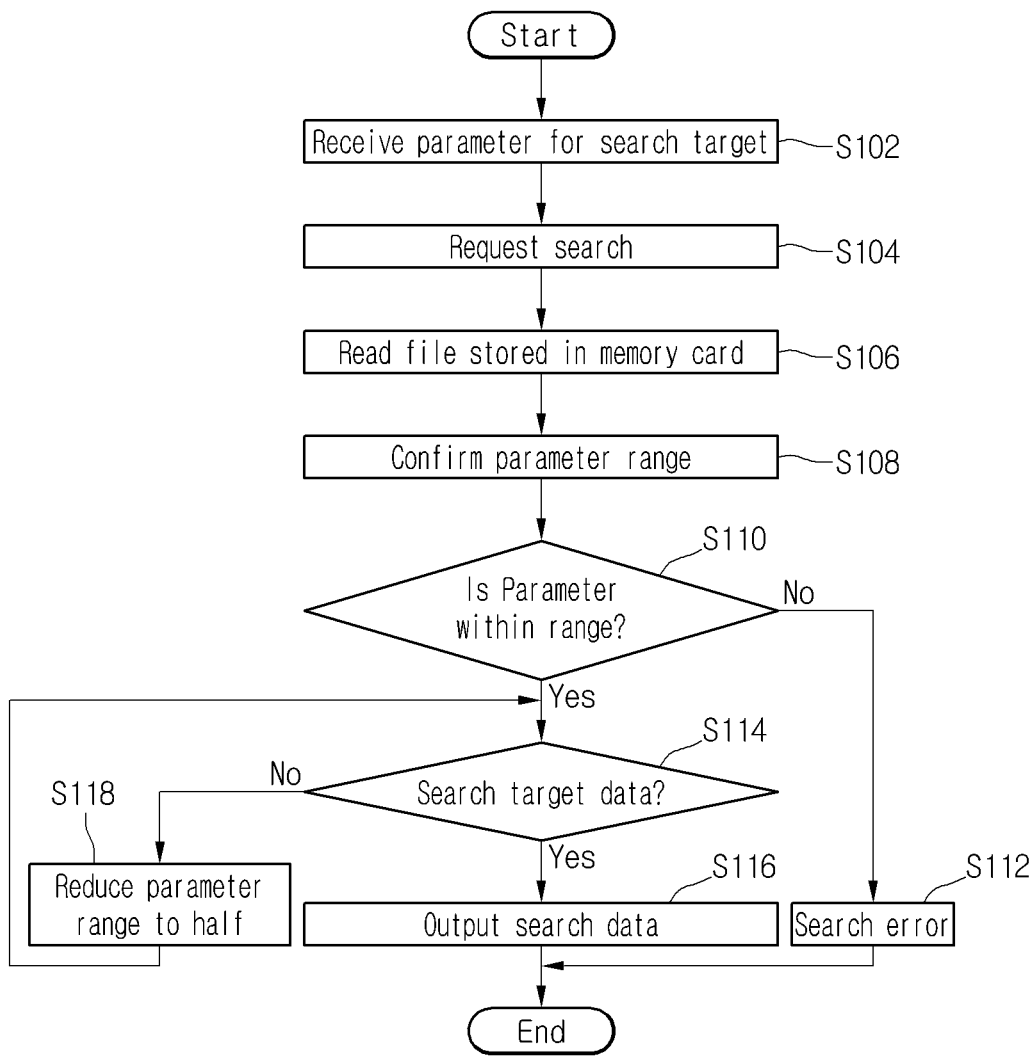
FIG. 1 is a flowchart illustrating a method of searching for a PLC data log according to the related art.

Terms and words used in the specification and the claims shall not be interpreted as commonly-used dictionary meanings, but shall be interpreted as to be relevant to the technical scope of the invention based on the fact that the inventor may property define the concept of the terms to explain the invention in best ways.

Therefore, the embodiments and the configurations depicted in the drawings are illustrative purposes only and do not represent all technical scopes of the embodiments, so it should be understood that various equivalents and modifications may exist at the time of filing this application.

Figure 2:
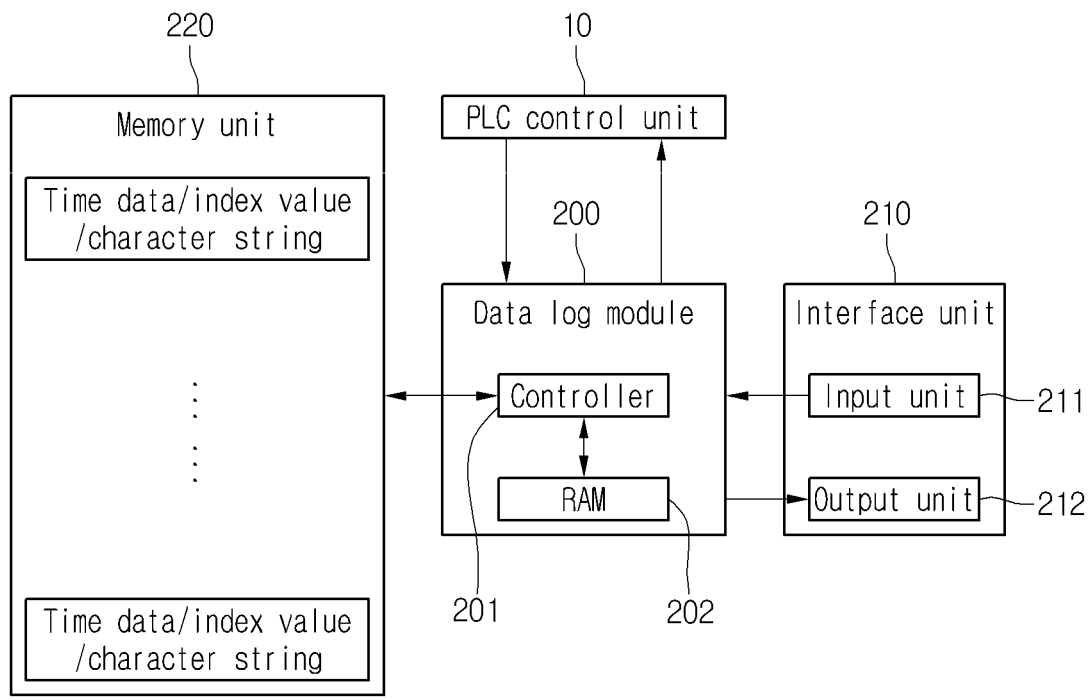
FIG. 2 is a block diagram illustrating a configuration of an apparatus for searching for a PLC data log according to the embodiment.

FIG. 2 is a block diagram illustrating a configuration of an apparatus for searching for a PLC data log according to the embodiment.

Referring to FIG. 2, the apparatus for searching for a PLC data log according to the embodiment includes a data log module 200, an interface unit 210, and a memory unit 220.

The data log module 200 may detect and search for a data search request signal input from a user. The data log module 200 may include a controller 201 and a RAM (random access memory) 202.

The controller 201 may detect the data search request signal input from the interface unit 210, and may operate a parameter range and a linear characteristic according to search target data corresponding to the detected data search request signal. The controller 201 calculates an index value or a time data value using the operated linear characteristic. The data to be searched may be extracted based on the calculated index value and time data value. The controller 201 may search for data corresponding to the calculated parameter and output the searched data as user request search data.

The RAM 202 may store data searched and calculated by the controller 201. The RAM 202 may temporarily store information on the linear characteristic and the data operated and searched by the controller 201 according to the embodiment. If the data request signal is detected from a PLC control unit 10, the RAM 202 may output corresponding data.

The interface unit 210 may receive a data search request signal from a user or output a result of the searched data. The interface unit 210 according to the embodiment may include an input unit 211 and an output unit 212.

The input unit 211 may receive a search request signal of the PLC data log. The input unit 211 may receive a parameter according to the search request signal. Further, the input unit 211 may receive the PLC data log from the outside and output the PLC data log to the memory unit 220. The input unit 211 may receive the parameter of the search data as a hexa value in a unit of a word.

The output unit 212 may output a searched result for the data search request input from the input unit 211. In addition, the output unit 212 may output the progress status or error information according to the data search request.

The memory unit 220 may store data and parameter values for the data input through the input unit 211. Data stored in the memory unit 220 may include a plurality of data each including a time data value, an index value, and a character string. That is, for example, the data stored in the memory unit 220 may include time data (date, time), index values, data, and data types (volume).

Figure 3:
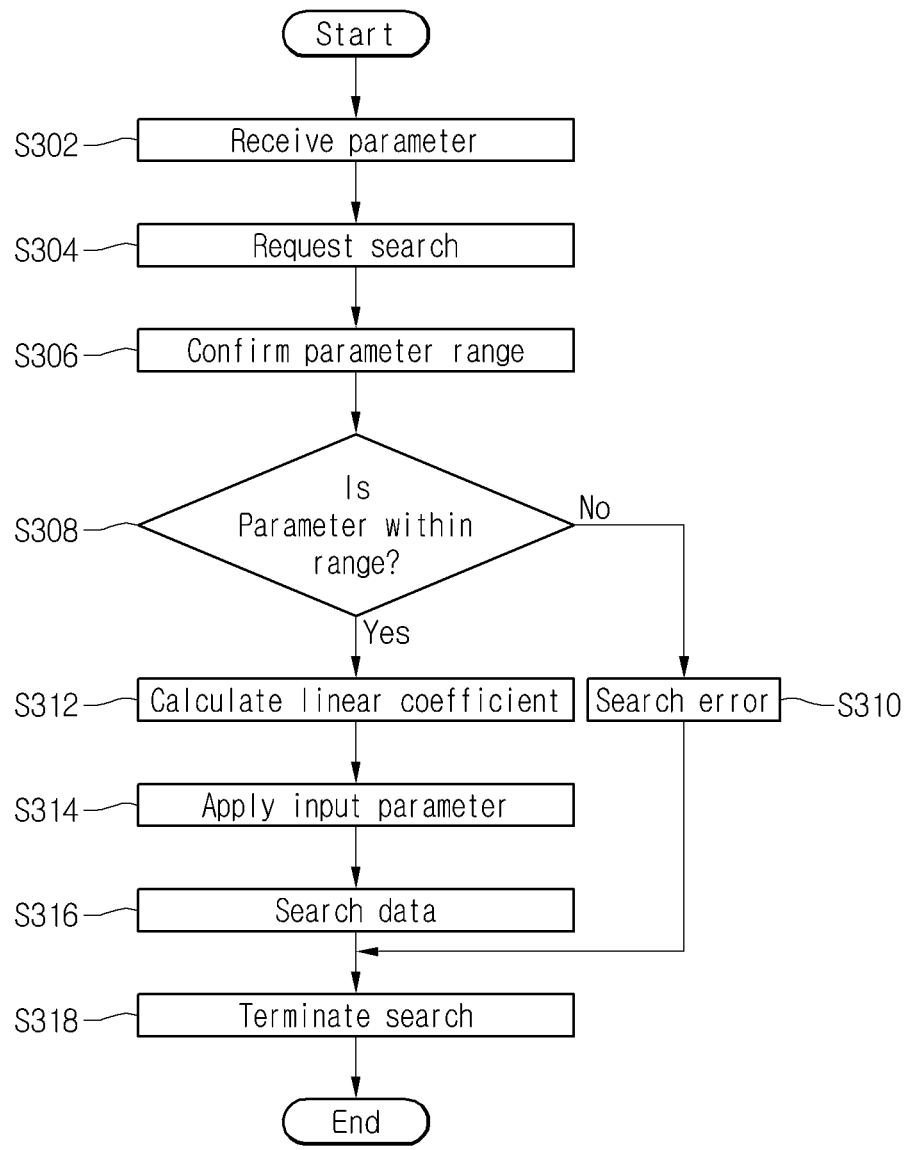
FIG. 3 is a flowchart illustrating a method for searching for a PLC data log according to the embodiment.
Figure 4:
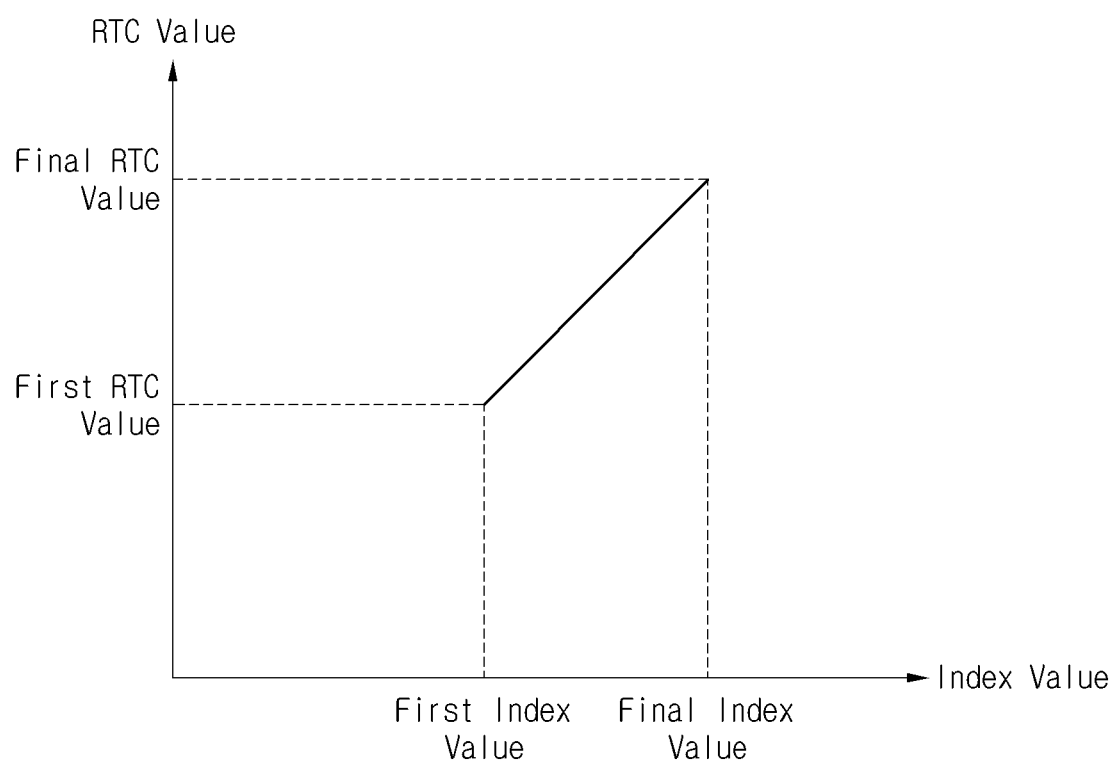
FIG. 4 is a graph illustrating a procedure of calculating a linear coefficient when searching for the PLC data log according to the embodiment.

FIG. 3 is a flowchart illustrating a method for searching for a PLC data log according to the embodiment, and FIG. 4 is a graph illustrating a procedure of calculating a linear coefficient when searching for the PLC data log according to the embodiment.

Referring to FIGS. 3 and 4, the controller 201 of the data log module 200 may receive a data search request signal and a parameter according to the data search request signal from the input unit 211 of the interface unit 210 (S302). The parameter may be input in the form of a hexa value such as "h000" in a unit of a word.

The controller 201 may detect a search request signal for searching for data corresponding to the received parameter and generate a control signal according to the search request signal (S304).

The controller 201 may confirm a parameter range corresponding to data stored in the memory unit 220 according to the data search request signal (S306).

When the received parameter is not included in the stored parameter range (S308), the controller 201 may output search error information (S310).

In contrast, when the received parameter is within the stored parameter range, the controller 201 may operate a linear coefficient according to a following Equation 1 (S312).

$$\frac{\text{Final}(RTC) - \text{First}(RTC)}{\text{Final}(Index) - \text{First}(Index)} = m \qquad \text{[Equation 1]}$$

The controller 201 may calculate a linear coefficient m by the Equation 1. In the Equation, First(Index) and Final(Index) represent a first index value and a final index value corresponding to the data stored in the memory unit 220, respectively. In addition, First(RTC) and Final(RTC) represent a first time data value and a final time data value corresponding to the data stored in the memory unit 220.

That is, as shown in FIG. 4, the controller 201 may calculate a linear coefficient having a linear characteristic using the final time data value Final(RTC) and the first time data value First(RTC), and the final index value Final(Index) and the final index value First(Index).

The linear coefficient m calculated from the Equation 1 by the controller 201 may be a gradient (coefficient) of a linear equation for searching for an index value corresponding to time data of search target data or time data corresponding to the index value.

The controller 201 may calculate an index value corresponding to time data or time data corresponding to the index value by Equations 2 or 3.

$$\text{Search}(RTC) = m \cdot \Delta \text{Index} + \alpha \qquad \text{[Equation 2]}$$

$$\frac{\Delta RTC}{m} - \alpha = \text{Search}(\text{Index}) \qquad \text{[Equation 3]}$$

The Equation 2 may calculate a time data value corresponding to an index value of search target data by applying the calculated linear coefficient m. Further, the Equation 3 may calculate an index value corresponding to a time data value of search target data by applying the calculated linear coefficient m. In this case, an offset $\alpha$ may be added according to the first time data value or the first index value.

The controller 201 applies an input parameter according to a time data value or an index value of the search target data based on the calculated linear characteristic (S314), and may search for the search target data from the memory unit 220 (S316).

The controller 201 may output a result of the searched data through the output unit 212 (S318). In addition, the controller 201 temporarily stores the searched data in the RAM 202. If a data request signal is input from the PLC control unit 10, the controller 201 may read and output the data stored in the RAM 202.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for searching for a programmable logic controller (PLC) data log, the apparatus comprising:
one or more processors and a memory including instructions that when executed perform a method including:
receive a search request signal and at least one parameter for data search and configured to output the data searched
store the data including time data and an index and the parameter input or output through the interface unit;
calculate a linear characteristic using a first equation;
calculate time data value or an index value from the linear coefficient, and
search for data corresponding to the calculated time data value or the calculated index value;

wherein the time data value or the index value is calculated based on a linear coefficient according to said first equation as follows:

$$\frac{\text{Final}(RTC) - \text{First}(RTC)}{\text{Final}(\text{Index}) - \text{First}(\text{Index})} = m$$

wherein m is the linear coefficient, First(Index) is a first index, First(RTC) is first time data, Final(Index) is a final index, and Final(RTC) is final time data; and wherein the one or more processors are further configured with instructions to:

operate the linear characteristic based on the at least one data search parameter and configured to extract search request data using the operated linear characteristic; and a random access memory (RAM) configured to store the operated linear characteristic and data corresponding to the operated linear characteristic.

2. The apparatus of claim 1, wherein the controller is further configured to cause the RAM to temporarily store data searched by the controller, and to output corresponding data when a data output request signal is detected.

3. The apparatus of claim 1, wherein the interface unit comprises:

an input unit configured to receive a data search request signal and a parameter value according to the data search request signal; and an output unit configured to output a search result of the data and a progress status or error information according to the data search request signal.

4. The apparatus of claim 1, wherein the controller is further configured to cause the memory unit to store at least one of data including the time data value, the index value, or a character string.

5. The apparatus of claim 4, wherein the data stored in the memory unit comprises a format of the time data, the index value, data, and data type (volume).

6. The apparatus of claim 1, wherein the parameter is input through the interface unit as a hex value in a unit of a word.

7. A method for searching for a programmable logic controller (PLC) data log, the method comprising:

receiving a search parameter;
calculating a linear coefficient for search target data;
calculating time data value or an index value from the linear coefficient, and
searching for data corresponding to the calculated time data value or the calculated index value;

wherein the time data value or the index value is calculated based on a linear coefficient according to a first equation as follows:

$$\frac{\text{Final}(RTC) - \text{First}(RTC)}{\text{Final}(\text{Index}) - \text{First}(\text{Index})} = m$$

wherein m is the linear coefficient, First(Index) is a first index, First(RTC) is first time data, Final(Index) is a final index, and Final(RTC) is final time data.

8. The method of claim 7, further comprising determining whether the received parameter is within a stored parameter range.

9. The method of claim 8, further comprising stopping corresponding search or outputting error information when the received parameter is not within the stored parameter range.

10. The method of claim 8, wherein the determining whether the received parameter is within the stored parameter range comprises:

reading a first time data value or a first index value and a final time data value or a final index value for data including at least two of the time data value, the index data, or a character string stored in a memory unit, and determining whether the time data value or the index of the search parameter is included in the read range.

11. The method of claim 7, wherein the search parameter is input as a hex value in a unit of a word.

12. The method of claim 7, wherein the time data value or the index value for the search target data is obtained from a linear equation according to a second equation as follows using the linear coefficient calculated by said first equation:

$$\text{Search}(RTC) = m \cdot \Delta \text{Index} + \alpha$$

where m is the linear coefficient, α is an offset, and Search (RTC) is an index result value.

13. The method of claim 7, further comprising:

temporarily storing the searched data in random access memory (RAM); and outputting corresponding data to a PLC control unit when a request signal of the searched data is detected from the PLC control unit.

* * * * *